United States Patent [19]

Faul et al.

[11] Patent Number: 5,403,384
[45] Date of Patent: Apr. 4, 1995

[54] APPARATUS AND METHOD FOR AVOIDANCE OF TURBOMACHINERY PRESSURE SURGE

[75] Inventors: Jeffrey C. Faul, Mountain View; Kenneth B. Groves, LaHonda; Debra L. Sutton, Napa, all of Calif.

[73] Assignee: FMC Corporation, Chicago, Ill.

[21] Appl. No.: 136,059

[22] Filed: Oct. 14, 1993

[51] Int. Cl.$^6$ .............................................. B01D 53/04
[52] U.S. Cl. ............................................ 95/96; 95/106; 96/115; 96/128; 96/130; 96/133
[58] Field of Search ............... 95/39, 41, 96, 106, 95/130; 96/112, 115, 126–128, 130, 133

[56] References Cited

U.S. PATENT DOCUMENTS

| | | | |
|---|---|---|---|
| 4,126,000 | 11/1978 | Funk | 95/39 X |
| 4,265,088 | 5/1981 | Funk | 95/39 X |
| 4,404,005 | 9/1983 | Hamlin et al. | 96/130 X |
| 4,732,579 | 3/1988 | Veitman et al. | 95/96 |
| 4,793,832 | 12/1988 | Veltman et al. | 55/23 |
| 5,151,022 | 9/1992 | Emerson et al. | 95/39 X |
| 5,152,812 | 10/1992 | Kovach | 95/41 |
| 5,203,889 | 4/1993 | Brown | 96/115 |
| 5,213,593 | 5/1993 | White, Jr. | 96/126 X |
| 5,298,054 | 3/1994 | Malik | 95/106 X |

FOREIGN PATENT DOCUMENTS

| | | | |
|---|---|---|---|
| 59-098715 | 6/1984 | Japan | 95/96 |
| 62-273026 | 11/1987 | Japan | 95/96 |

Primary Examiner—Robert Spitzer
Attorney, Agent, or Firm—H. M. Stanley; R. C. Kamp; R. B. Megley

[57] ABSTRACT

In a regenerable collective protection system the turbine of an air cycle machine is driven by a potion of the clean air output of a pressure swing adsorber bed pair in the system. The beds in the pair are used alternately to cleanse contaminated air. They are then alternately purged of contaminant products. Valves are used to direct these alternate operations. The valve closures cause overpressures in the clean air output. The overpressures are predictable in relation to the valve actuation sequence and are removed by coordinating operation of a surge air bleed valve in the clean air output with valve actuation in the pressure swing adsorber bed pair.

7 Claims, 2 Drawing Sheets

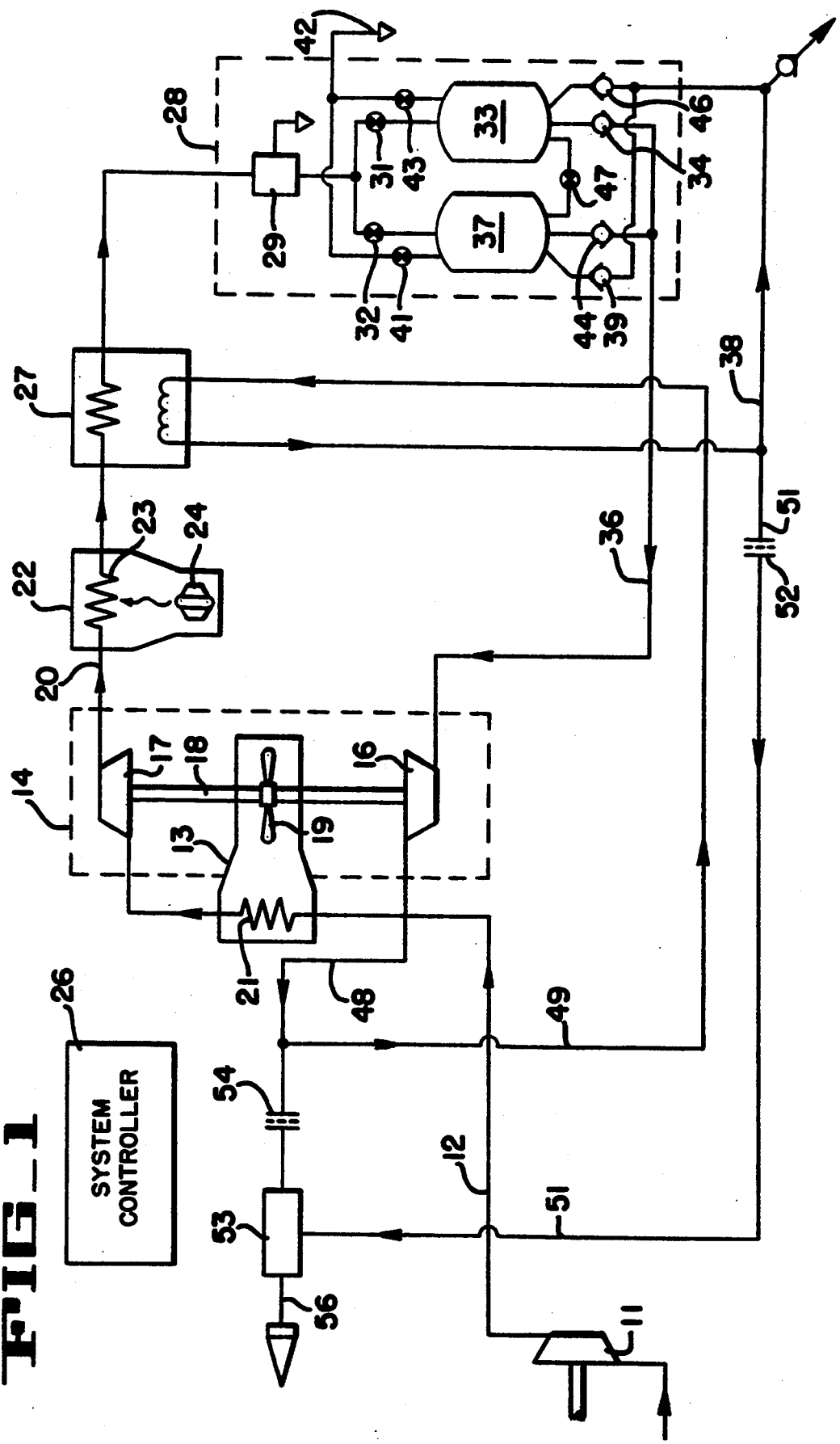

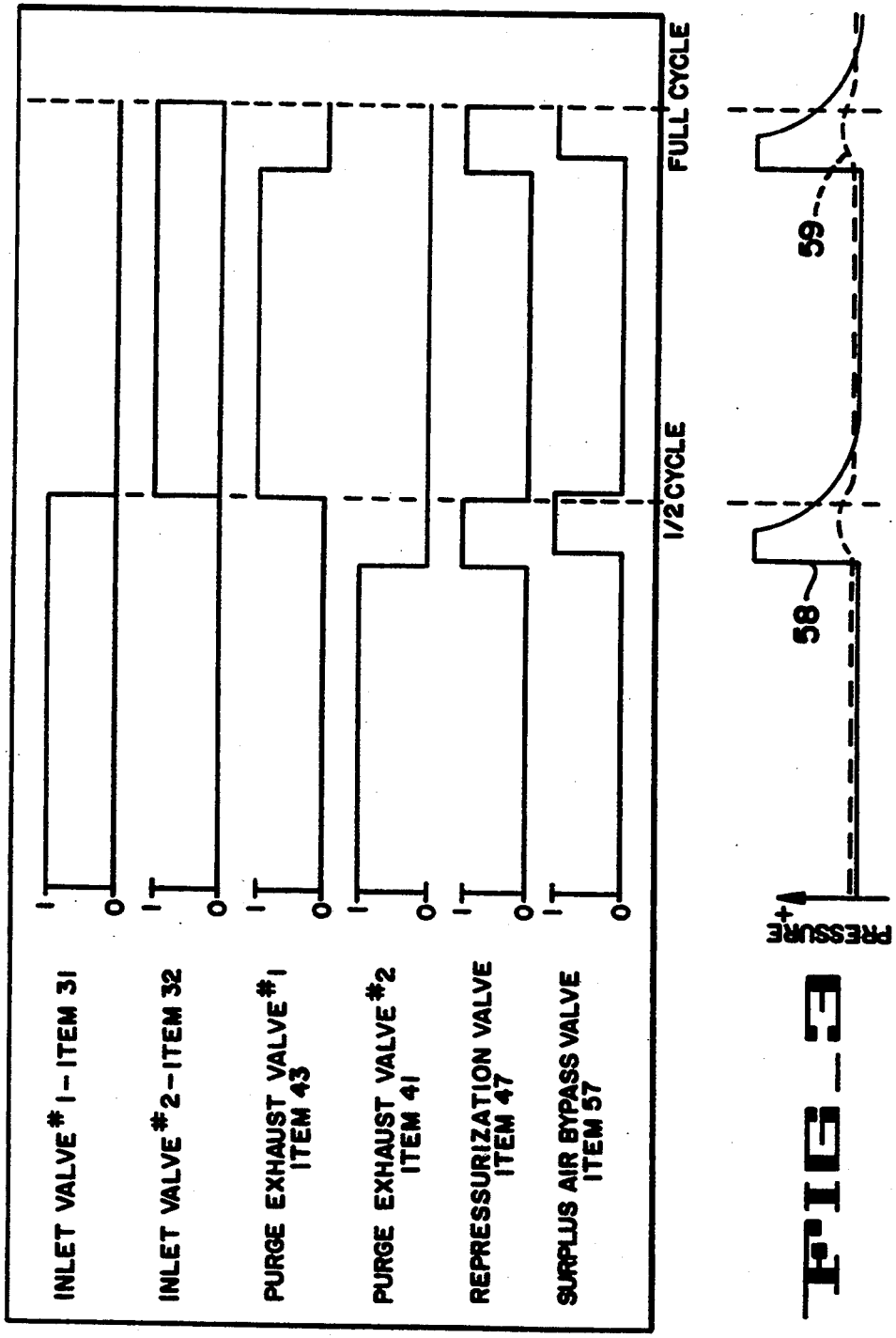

APPARATUS AND METHOD FOR AVOIDANCE OF TURBOMACHINERY PRESSURE SURGE

SUMMARY OF THE INVENTION

The current invention relates to apparatus for prolonging the life of turbomachinery which is designed to operate at a substantially constant speed. The turbomachinery includes a drive turbine and operates in conjunction with a pressure swing adsorber bed pair, the bed pair having common clean air outlets and common purge air inlets and a plurality of valves coupled to the outlets and inlets which are actuated between open and closed positions. A first conduit means is provided for coupling the common clean air outlets to the turbomachinery drive turbine. A second conduit means is provided for coupling the turbomachinery drive turbine to the common purge air inlet. Means is provided for bleeding air pressure from the first and second conduit means in timed relation with actuation of the plurality or valves, so that pressure surge in the first and second conduit means due to valve actuation is avoided.

In another aspect of the invention an improvement is provided in a regenerable collective protection system for receiving contaminated air and providing clean air. The system has a pressure swing adsorber bed pair with common plenum purge air inlets and common plenum clean air outlets. A plurality of valves is contained in the bed pair which are actuated between closed and opened positions for controlling the purge air inlets and clean air outlets. The system has an air cycle machine with a turbine drive coupled to the clean air outlets through a clean air path for driving a compressor for system contaminated input air. A portion of the clean air from the pressure swing adsorber bed pair is conducted along a branch of the clean air path to the purge air inlets to purge the beds in accordance with the positioning of the plurality of valves. Improvement is provided in the form of means positioned in the clean air path for maintaining a substantially constant pressure in the path, so that the turbine drive is maintained at a substantially constant speed.

The invention also relates to a method of maintaining constant speed for a drive turbine in turbomachinery operating in conjunction with a pressure swing adsorber having a clean air outlet plenum and a purge air input plenum. The clean air output is used to drive the turbine and the turbine is connected to the purge air input plenum. The purge air input is controlled by actuation of a plurality of valves. The method comprises the step of bleeding off overpressure in the clean air output which is due to actuation of the plurality of valves, whereby substantially constant pressure is delivered to the drive turbine.

BRIEF DESCRIPTION OF THE DRAWINGS

FIG. 1 is a schematic depiction of a regenerable collective protection system utilizing the present invention.

FIG. 2 is a graph showing valve actuation sequence.

FIG. 3 is a graph showing pressure surge avoidance provided by the present invention.

DESCRIPTION OF THE PREFERRED EMBODIMENT

Turning to FIG. 1 the invention herein will be disclosed in conjunction with a regenerable collective protection system (RCPS) wherein contaminated air is provided to the RCPS by a compressor stage 11. The compressor could be any source, for example, a compressor stage in a turbine engine. The contaminated air is conducted along a conduit 12 to a heat exchanger or precooler 13 which is contained within an air cycle machine 14, shown enclosed by dashed lines. The air cycle machine has a drive turbine 16 which drives a compressor 17 through a shaft 18. Mounted on the shaft and driven thereby is a fan 19 which provides air flow over a set of coils 21 in the heat exchanger 13 to remove heat from the contaminated air flowing through the conduit 12. The fan 19 is placed between the drive turbine 16 and the compressor 17 so that any contaminated air which may escape from the conduit 12 through the air bearings between the shaft 18 and the casing of the air cycle machine will be exhausted to ambient through the heat exchanger air flow to ambient caused by the fan 19. Such a heat exchanger or as precooler 13 is available as vendor identification No. 13430-1 from Alpha United, El Segundo, Calif. It is essential to preservation of the life of the air cycle machine 14 that the speed or the turbine 16 and therefore of the compressor 17 be constant. It is also essential, therefore, that the air flow driving the turbine 16 be free of overpressure pulses or pressure spikes. An appropriate air cycle machine is a modified T-46 air cycle machine manufactured by Air Research Manufacturing Company, Torrance, Calif.

The contaminated air is routed from the precooler 13 through the conduit 12 to compressor 17 and from compressor 17 is seen to be directed along a conduit 20 to an after cooler 22. The after cooler has heat exchange coils or mechanism 23 over which air is caused to flow by an electrically driven fan 24. The RCPS has an electronic controller 26 which adjusts the speed of the fan 24 in response to temperature which is sensed at the output side of a reheater 27 through which the contaminated air in conduit 20 flows. As a result, the contaminated air in conduit 20 is provided to the input of a pressure swing adsorber (PSA) bed air assembly 28 shown enclosed in dashed lines in FIG. 1. The after cooler 22 is available as vendor identification No. 13440-1 from Alpha United, El Segundo, Calif.

The contaminated air in conduit 20 is first delivered to a prefilter 29 which is also a water separator. An appropriate prefilter is seen in vendor's item identification No. A288825 obtained from Pall Safety Atmospheres, Pinellas Park, Fla. The output from the prefilter 29 is seen to be directed to a first inlet valve 31 and a second inlet valve 32 in the PSA bed pair. If the first inlet valve 31 is opened, contaminated air is directed into a first PSA bed 33 where the contaminants are removed, the air flows through a check valve 34 and into a contaminant free air conduit 36. While the first PSA bed 33 is cleansing contaminated air, a second PSA bed 37 is being purged by air flow from a clean air conduit 38 through a check valve 39 into the second bed 37. A second purge exhaust valve 41 is opened during this period to allow the cleansing air for the regeneration of the second PSA bed 37 to be thrown overboard through a purge outlet 42.

After a period of time wherein tilt: first PSA bed 33 has cleansed products carried in the contaminated air the first inlet valve 31 is closed and the second inlet valve 32 is opened. The second purge exhaust valve 41 is closed in sequence to be hereinafter described, and a first purge exhaust valve 43 is opened. As a consequence, contaminated air flows through the second inlet valve 32 into the second PSA bed 37 and through a second outlet check valve 44 into the contaminate free air conduit 36. At the same time clean air from conduit 38 is directed through a purge check valve 46 into PSA bed 33 to provide cleansing of the bed and is then exhausted through the open purge exhaust valve 43 and the purge air outlet 42 to ambient. A repressurization valve 47 is included in the pressure swing adsorber 28. A description of the function of valve 47, together with the other valves in the pressure swing adsorber 28 will be undertaken hereinafter. The pressure swing adsorber bed pair is known as vendor's item identification No. A288823, obtainable from Pall Safety Atmospheres, Pinellas Park, Fla.

From FIG. 1 it may be seen that the flow of air in clean air conduit 36 is used to drive the turbine 16 in the air cycle machine 14. Clean air is taken from the drive turbine 16 in a conduit 48 and a portion of it is split off into a conduit 49 to pass through the reheater 27 where the clean air is warmed by the hotter contaminated air passing therethrough in heat exchange coils 25. The warmed clean air in conduit 49 is delivered in part to the conduit 38 which provides the clean purge air through the purge check valves 46 or 39 as described hereinbefore. Another portion of the warmed clean air from conduit 49 is directed along the conduit 51 through a flow control valve 52. The flow control valve 52 is an electronically driven butterfly valve which provides an appropriate portion of warm air from conduit 49 to a mixer 53. The cooler contaminant free air in conduit 48 is also delivered to a similar flow control valve 54 which in turn proportions cooler contaminant free air to the mixer 53. Temperature sensors provide signals which are used by the system controller 26 to adjust the aperture within and therefore the flow through the flow control valves 52 and 54 to obtain an appropriate mix of hotter and cooler contaminant free air at the outlet side of the mixer 53 through a conduit 56 to a crew compartment. Flow control valves 52 and 54 are available as vendor identification No. 79318-326375 from Whittaker Controls, Inc., North Hollywood, Calif.

Turning now to FIG. 2 of the drawings, the sequence of operation of the valves in PSA bed pair 28 and the corresponding operation of the surplus air bypass valve, seen as item 57 in FIG. 1, will be described. In the first half cycle, FIG. 2 shows first inlet valve 31 open. Second inlet valve 32 is shown closed. The first purge exhaust valve 43 is also shown closed. The second purge exhaust valve 41 is opened so that bed 37 may be purged through purge outlet 42. During the first half of the cycle the second purge exhaust valve is open for the majority of the cycle and then is closed before the termination of the first half cycle. When the purge exhaust valve 41 is closed the repressurization valve 47 is opened between beds 33 and 37 so that pressure from the cleansing bed 33 is provided to bed 37 to bring the pressure therein up from ambient pressure during purging. The closure of the purge exhaust valve 41 causes the pressure surge or spike in the clean air conduit 38 which provides purge air to the PSA beds. The pressure spike may be seen to be experienced by the turbine 16 through the conduits 49 and 48 which would, if left unattenuated, alter the speed of the drive turbine 16. To combat this turbine speed altering pressure pulse, the surplus air bypass valve 57 is controlled by the system controller 26 to open about 100 to 150 milliseconds after purge exhaust valve 41 closes and repressurization valve 47 opens. The plurality of actuated valves 31, 32, 41, 43 and 47 in the PSA bed 28 have response times in the order of 300 milliseconds. The response time for the solenoid pressure relief valve used as surplus air bypass valve 57 is about 30 milliseconds. The system of FIG. 1 is therefore tailored to the response characteristics of the valves contained in the PSA bed 28. In this instance, the 100 to 150 millisecond delay for opening of valve 57 together with leaving valve 57 open for approximately 600 milliseconds, was found to optimize tile attenuation of the pressure surges or spikes in the system. An appropriate valve for use as surplus air bypass valve 57 is found in vendor's item identification No. 16F 24C6164A3FGC80 available from Parker Hannifin Corporation, Madison, Mass. as a solenoid pressure relief valve.

In the second half of the cycle as seen in FIG. 2 the first inlet valve 31 is closed and the second inlet valve 32 is opened. The first purge exhaust valve 43 is opened and the second purge exhaust valve 41 is closed. As a result contaminated air is cleaned by passing through the second bed 37 and the first bed 33 is purged of contaminated air products as hereinbefore described. Prior to the end of the full cycle the first purge exhaust valve 43 is closed and the repressurization valve 47 is opened to effect the result described hereinbefore 100 to 150 milliseconds after the opening of the repressurization valve 47 the surplus air bypass valve 57 is opened and held open for approximately 600 milliseconds. The pressure pulse or spike caused by valve actuation in the PSA bed pair 28 is therefore attenuated by bleeding pressure through bypass valve 57.

FIG. 3 is a depiction of the pressure pulses or spikes in the system without the surplus air bypass valve 57 as seen in the solid line of curve 58. The dashed line of curve 59 of FIG. 3 shows pressure fluctuation when the system utilizes the surplus air bypass valve 57 as described herein. The pressure diagram of FIG. 3 is aligned in timed sequence with the valve actuation diagram of FIG. 2 to better depict the occurrence of the pressure surges as a function of valve actuation.

Although the best mode contemplated for carrying out the present invention has been herein shown and described, it will be apparent that modification and variation may be made without departing from what is regarded to be the subject matter of the invention.

What is claimed is:

1. Apparatus for prolonging the life of turbomachinery designed to operate at a substantially constant speed, wherein the turbomachinery includes a drive turbine and operates in conjunction with a pressure swing adsorber bed pair, the bed pair having common clean air outlets and common purge air inlets, controlled by a plurality of valves coupled to the outlets and inlets which are actuated between open and closed positions, comprising first conduit means for coupling the common clean air outlets to the turbomachinery drive turbine, second conduit means for coupling the turbomachinery drive turbine to the common purge air inlets, and means for bleeding air pressure from said first and second conduit means in timed relation with actuation of the plurality of valves, whereby pressure surge in said first and second conduit means due to valve actuation is avoided.

2. Apparatus as in claim 1 wherein said means for bleeding air pressure comprises a solenoid actuated relief valve.

3. Apparatus as in claim 1 wherein said means for bleeding air pressure comprises valve means having an actuation response characteristic at least as fast as the actuation response of the plurality of valves coupled to the common purge air inlets.

4. In a regenerable collective protection system for receiving contaminated air and providing clean air having a pressure swing adsorber bed pair with common plenum purge air inlets and common plenum clean air outlets, having a plurality of valves actuated between closed and open positions for controlling the purge air inlets and clean air outlets, and having an air cycle machine with a turbine drive coupled to the clean air outlets through a clean air path for driving a compressor for system contaminated input air, a portion of the clean air being conducted along a branch of the clean air path to the purge air inlets to purge the beds in accordance with the positioning of the plurality of valves, the improvement comprising means positioned in the clean air path or maintaining a substantially constant pressure therein, whereby the turbine drive is maintained at a substantially constant speed.

5. A regenerable collective protection system as in claim 4 wherein said means positioned in the clean air path comprises a surplus air bypass valve.

6. A regenerable collective protection system as in claim 4 wherein said means positioned in the clean air path comprises valve means having an actuation response characteristic at least as fast as the actuation response of the plurality of valves.

7. A method of maintaining constant speed for a drive turbine in turbomachinery operating in conjunction with a pressure swing adsorber having a clean air output plenum for providing a clean air output and a purge air input plenum for receiving a purge air input, wherein the clean air output is used to drive the turbine and is connected to the purge air input plenum, and the purge air input is controlled by actuation of a plurality of valves, comprising the step of bleeding off overpressure in the clean air output due to actuation of the plurality of valves whereby substantially constant pressure is delivered to the drive turbine.

* * * * *